(12) United States Patent
Gupta et al.

(10) Patent No.: US 11,647,262 B2
(45) Date of Patent: May 9, 2023

(54) CONTENT SUMMARIES FOR UPCOMING MEDIA ASSETS

(71) Applicant: Rovi Guides, Inc., San Jose, CA (US)

(72) Inventors: Vikram Makam Gupta, Karnataka (IN); Vishwas Sharadanagar Panchaksharaiah, Karnataka (IN)

(73) Assignee: Rovi Guides, San Jose, CA (US)

( * ) Notice: Subject to any disclaimer, the term of this patent is extended or adjusted under 35 U.S.C. 154(b) by 0 days.

(21) Appl. No.: 17/117,536

(22) Filed: Dec. 10, 2020

(65) Prior Publication Data
US 2022/0191600 A1    Jun. 16, 2022

(51) Int. Cl.
*H04N 21/8549* (2011.01)
*H04N 21/482* (2011.01)
*H04N 21/45* (2011.01)
*H04N 21/81* (2011.01)

(52) U.S. Cl.
CPC ..... *H04N 21/8549* (2013.01); *H04N 21/4532* (2013.01); *H04N 21/4826* (2013.01); *H04N 21/812* (2013.01)

(58) Field of Classification Search
CPC ........... H04N 21/8549; H04N 21/4532; H04N 21/4826; H04N 21/812
See application file for complete search history.

(56) References Cited

U.S. PATENT DOCUMENTS

| | | | | |
|---|---|---|---|---|
| 9,094,738 | B2* | 7/2015 | Kishore | H04N 21/23439 |
| 2005/0120368 | A1* | 6/2005 | Goronzy | G06F 16/735 |
| | | | | 725/28 |
| 2007/0157237 | A1* | 7/2007 | Cordray | H04N 21/4532 |
| | | | | 725/89 |
| 2009/0235308 | A1* | 9/2009 | Ehlers | H04N 21/44016 |
| | | | | 725/34 |
| 2014/0298378 | A1* | 10/2014 | Kelley | H04N 21/8133 |
| | | | | 725/32 |

\* cited by examiner

*Primary Examiner* — Thai Q Tran
*Assistant Examiner* — Jose M Mesa
(74) *Attorney, Agent, or Firm* — Haley Guiliano LLP

(57) ABSTRACT

Systems and methods are disclosed to provide one or more content summaries for one or more media assets, wherein it is determined that consumption associated with a profile of a media asset will begin at a first time and at a second time that is a period of time prior to the first time, it is caused to be provided one or more content summaries for the one or more media assets, wherein the one or more content summaries are selected based at least on a duration of the content summary, such that a duration of the content summary is not greater than the period of time.

20 Claims, 6 Drawing Sheets

CONTENT SUMMARIES FOR UPCOMING MEDIA ASSETS

BACKGROUND

The present disclosure relates to the provision of content summaries to assist a user in choosing a media asset among a plurality of upcoming media assets.

SUMMARY

The amount of available or soon-to-be available media assets, in particular of series including a plurality of episodes, is constantly increasing. The general offer for content is so wide that no one can watch everything and no one actually desires to watch everything. Therefore, any consumption of media content involves choosing and making a decision. In addition, some users might change their mind and, instead of continuing to watch one series, may start a new series with whatever episode that is going to be aired next on television.

There is a need for improvement of existing techniques. In particular, it has been observed that some users are available to watch content before the live airing (such as a prime time), such that there is an amount of time that could be used to provide information about upcoming episodes to be aired, for example in prime time. Systems and methods are disclosed herein for automatically providing content summary of at least one upcoming media asset (e.g., an episode of a series), the content summary being determined based at least on an amount of time available before the upcoming media asset starts. The systems and methods are dynamically implemented and adapt to the schedule of the user. For example, a media content system may determine a first time at which a profile (e.g., a user profile) will consume a media asset among one or more media assets. The first time is, for example, a television prime time, during which several different media assets are being simultaneously aired. At a second time that is a period of time prior to the first time, the media content system causes to be provided (e.g., generates for display) one or more selected content summaries for the one or more media assets. The media content system selects content summaries based at least on a duration of each content summary that is not greater than the period of time. The user is then free to choose which content summary to watch and he or she is ensured that he or she will not miss the beginning of the upcoming media asset. A score may be associated with each content summary, wherein the score is used to rank the content summary. A list of the available content summaries may be displayed, ranked per the score (top score to bottom score for instance) and the user may choose which content summary to play. In particular, the media content system may determine the second time based on an input on the profile (e.g., the user turning on the television), indicating that the user is available to watch some content.

In an embodiment, the media content system may retrieve a pool of content summaries and may compute a score for each content summary of the pool. A selection may be then performed on that pool, using the score, and the selected content summaries may be caused to be provided (e.g., they may be generated to be displayed or choosable for viewing). The pool of content summaries may include at least one content summary for each media asset. In an implementation, several content summaries for a same media assets are generated. The closer the duration of the content summary is to the period of time (i.e., the time available before the prime time), the higher the score. Other parameters may be involved in the computation of the score, such as a preference (e.g., using the user's profile) and a linearity of the media asset (i.e., the importance of sequentiality between different media assets forming episodes of a series).

In an embodiment, the upcoming media assets are not yet available before the first time (e.g., the prime time). In an embodiment, the media content system generates the summaries using content readily available for the profile on remote servers. For example, when the upcoming media asset is an upcoming episode of a series, the content summary may include content from at least one previous episode of the series.

Media content mechanisms, techniques and systems are presently introduced to generate content summaries for upcoming media assets.

BRIEF DESCRIPTION OF THE DRAWINGS

The above and other objects and advantages of the disclosure will be apparent upon consideration of the following detailed description, taken in conjunction with the accompanying drawings, in which.

DETAILED DESCRIPTION

Methods and systems are disclosed herein to provide a content summary to a viewer, the content summary being for an upcoming media asset that is to be output to the viewer at a given time. The content summary includes information that helps the viewer understand and enjoy the upcoming media asset, but, in one embodiment, does not contain any portion thereof. In particular, one or more upcoming media assets may be aired at a specific time that is beyond the control of the viewer. The media assets may be live TV programs such as movies, episodes of a series, TV shows, etc. The user device may be a smartphone, a tablet, a laptop, a phablet, a computer with a display, a television, a Smart TV, a set-top box connected to a screen, a video game console connected to a screen, etc.

Figure 1:
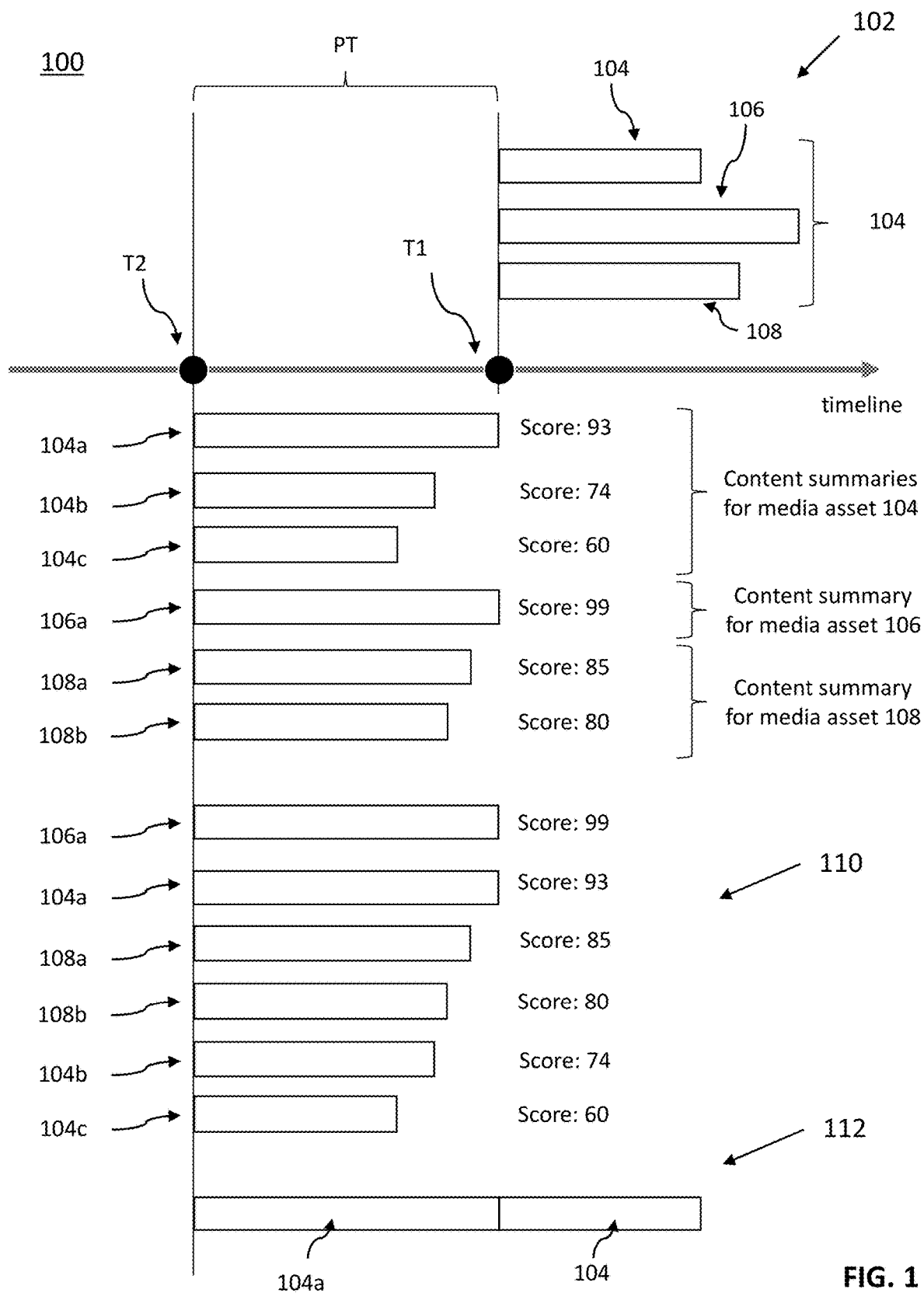
FIG. 1 depicts an illustrative diagram for providing one or more content summaries to a viewer, in accordance with some embodiments of the disclosure.

FIG. 1 shows an illustration 100 of different steps for providing a content summary for a media asset to a profile, by means of a media content system (not illustrated in FIG. 1). The profile may be a user profile associated with a user, which contains a viewing history and preferences of the user. More specifically, as represented at 102, the media content system may determine one or more media assets 104, 106, 108 that are to begin at a first time T1 (represented on a timeline). By "begin", it is meant that at the first time T1, the media assets 104, 106, 108 will be accessible for viewing by the profile. In particular, they may all start at the same time. In an embodiment, the first time T1 may be a prime time (e.g., 7 pm in the US, 9 pm in France, etc.) at which the media assets 104, 106, 108 will become available at the same time. The media assets 104, 106, 108 may be further determined based on the profile (e.g., through the viewing history or the preferences), such that not all media assets that may be aired at the first time T1 are involved in the method for providing content summary. The media content system may determine a second time T2 that is period of time PT prior to the first time T1. The second time T2 may correspond to a time from which the profile may be solicited to receive content, until time T1 when the media assets are being displayed. This means that the viewer, before the prime time T1, has decided that he or she is free to watch some content until the media assets 104, 104, 106 begin. The media content system may assist him or her in making a choice. At the second time T2, the media content system may provide, to the profile, one or more content summaries, for example 104a, 104b, 104c, 106a, 108a, 108b for the one or more media assets 104, 106, 108. Each of the content summaries that are provided to the profile is selected based at least on a duration of the content summary (represented by a length of the bar along the timeline). For example, the one or more content summaries may be presented as an icon, thumbnail or selectable element, in a list. The media content system provides to the profile only content summaries whose lengths are less than the period of time PT, represented in FIG. 1 by the right extremity of each bar being to the left of the first time T1. This concretely means that any content summary started at the second time T2 will be over by the first time T1. This ensures that the user will not miss the beginning of the media asset that he or she chooses to watch. For each media asset 104, 106, 108, the media content may retrieve one or more content summaries, thereby forming a pool of content summaries. For instance, as illustrated in FIG. 1, for media asset 104, three content summaries 104a, 104b, 104c are retrieved; for media asset 106, one content summary 106a is retrieved; and for media asset 108, two content summaries 108a, 108b are retrieved. To perform the selection, the media content system may compute a score for each content summary, the score taking into account the duration of the content summary. In addition, as represented at 110, the media content system may provide a list of the content summaries 104a-c, 106a, 108a-b, ranked based on the score (e.g., the top score at the top, more easily selectable on the profile, and the lower score at the bottom, less easily selectable by the profile), wherein the content summaries are selectable by an input. The score (or any representation of the score, such as a conversion into percentages) may be displayed along with the content summaries, especially when a list with several content summaries is displayed. Finally, as represented at 112, the media content system may receive a selection from the profile of a content summary (here, content summary 104a) and starts playing the content summary 104a. In addition, the media content system may also receive, at around time T1, a selection by the profile of the media asset to watch (here, media asset 104, because it is the media asset that is related to the content summary that was displayed between time T2 and time T1).

Figure 2:
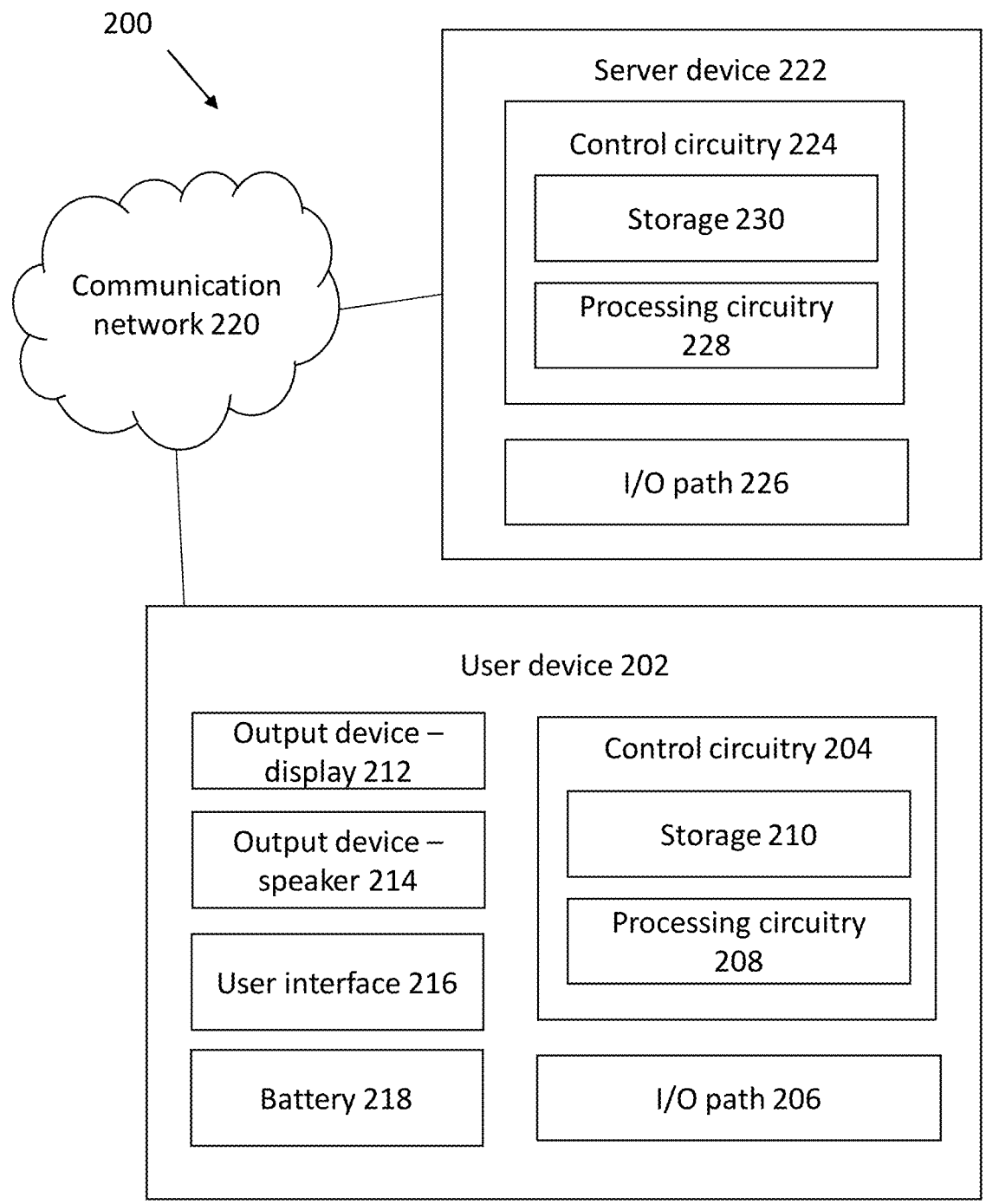
FIG. 2 is an illustrative topology of equipment (or computing configuration) programmed and configured for providing content summaries, in accordance with some embodiments of the disclosure.

FIG. 2 shows an illustrative block diagram of a computing configuration 200 that may include the media content system presently described. Computing configuration 200 includes a user device 202. In some embodiments, the user device 202 may include control circuitry 204 and an input/output (I/O) path 206. Control circuitry 204 may include processing circuitry 208, and storage 210 (e.g., RAM, ROM, hard disk, removable disk, etc.). I/O path 206 may provide device information, or other data, over a local area network (LAN) or wide area network (WAN), and/or other content and data to control circuitry 204. Control circuitry 204 may be used to send and receive commands, requests, signals (digital and analog), and other suitable data using I/O path 206. I/O path 206 may connect control circuitry 204 (and specifically processing circuitry 308) to one or more communications paths.

User device 202 may include at least one output device, such as a display 212 (e.g., a screen) and/or a speaker 214 to output content visually and audibly. In addition, to interact with a user, user device 202 may include a user interface 216. The user interface 216 may include a touchscreen, mouse, keyboard and/or any other types of device. The user interface 216 is connected to the I/O path 206 and the control circuitry 204. In an embodiment, the user interface 216 and the display 212 may be a touchscreen enabling the user to provide input(s) to the user device. The display 212 may be a screen (such as a monitor or a TV). The user device 202 may be a smartphone, a tablet, an e-reader, a laptop, a smart TV, a phablet, etc. Alternatively, the output device may be connected to the user device. In this case, the user device may be a set-top box, a computer tower, etc.

Control circuitry 204 may be based on any suitable processing circuitry such as processing circuitry 208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Memory may be an electronic storage device provided as storage 210, which is part of control circuitry 204. Storage 210 may store instructions that, when executed by processing circuitry 208, perform the processes described herein. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions). Storage 210 may be configured to store the media asset or at least to act as a buffer when the media asset is being streamed.

Computing configuration 200 may also include a communication network 220 and a server device 222. The user device 202 may be coupled to the communication network 220 to communicate with the server device 222. The communication network 220 may be one or more networks including the Internet, a mobile phone network, mobile voice or data network (e.g., a 5G, 4G or LTE network), mesh network, peer-to-peer network, cable network, or other types of communication network or combinations of communication networks.

In some embodiments, server device 222 may include control circuitry 224 and an input/output (I/O) path 226. Control circuitry 204 may include processing circuitry 228, and storage 230, which may be similar to those already discussed in relation to the user device 202. Server device 222 may be a content provider for the user device 202, such as a streaming, VOD, replay platform, etc.

The media content system may comprise the user device 202 or the server device 222, in a client/server approach or depending on whether the media asset is being streamed from the server device 222 or being retrieved from the storage 210. Alternatively, the media content system is distributed over the user device 202 and the server device 222.

Figure 3:
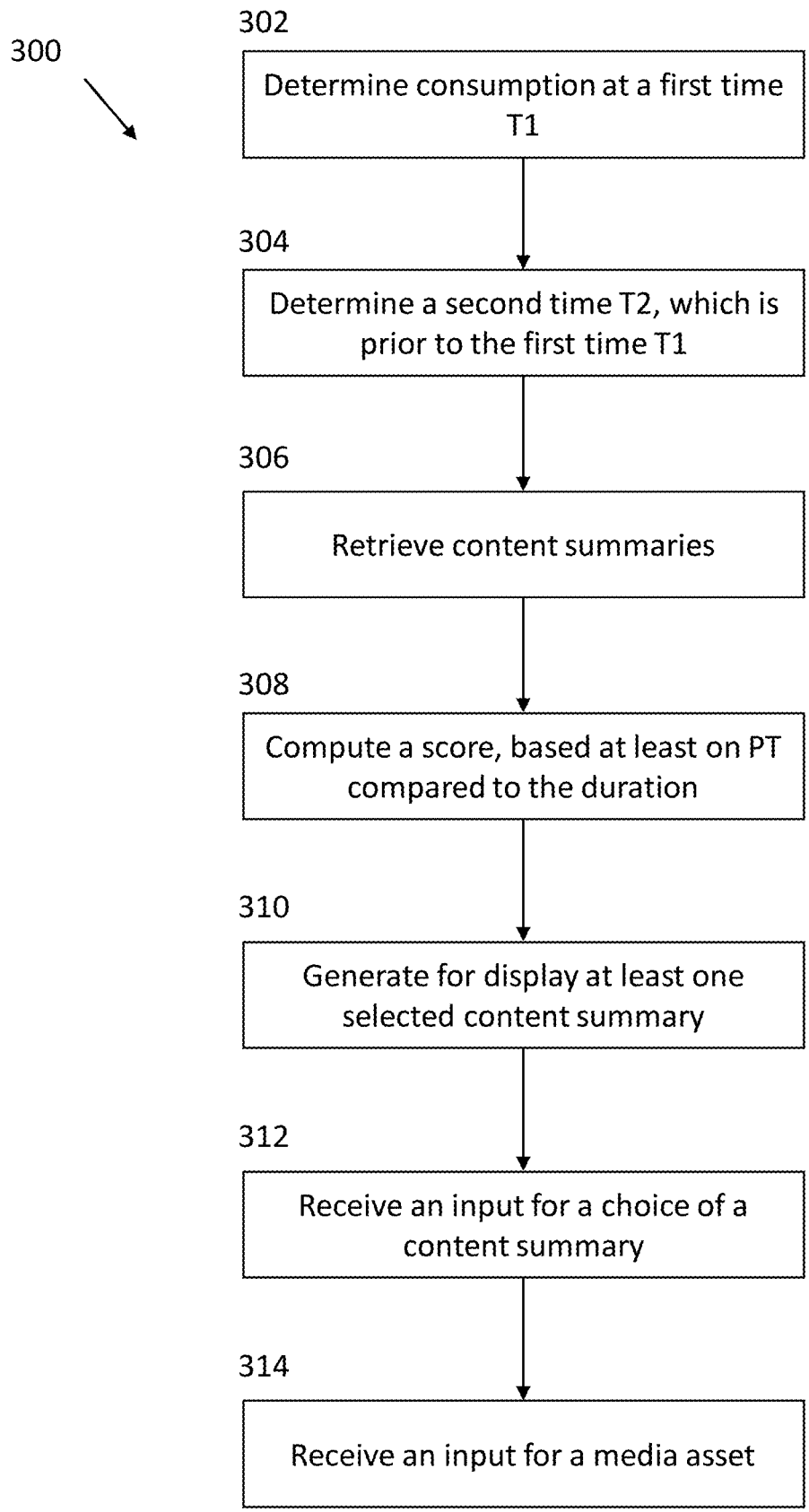
FIG. 3 is an illustrative flowchart of a process for providing content summary, in accordance with some embodiments of the disclosure.

FIG. 3 is an illustrative flowchart of a process 300 for providing a content summary or content summaries, in accordance with some embodiments of the disclosure. Unless specified otherwise, process 300, and any of the following processes, may be executed by any of control circuitry 204 or 222 or any combination thereof, using the communication network 220.

At step 302, control circuitry determines that consumption, associated with a profile, of one or more media assets is to begin at a first time T1. The profile may be a user profile on the user device 202 or on the server device 222, associated with an account, for example. In an embodiment, each media asset is an episode of a series. The series may be linear, wherein the episodes are meant to be watched in a specified order, or non-linear, wherein the episodes are meant to be watched in any order. The first time T1 may be a time before which the one or more media assets are not available to output for the profile. Any exclusive program on television (i.e., one never displayed before and not accessible on replay or video-on-demand or any other streaming services) falls under that definition. In an example, the first time T1 is a prime time, for which the audience may schedule their daily activities to be able to watch one of the media assets that are to be aired. The first time may the end of commercial break on a TV channel. The first time may be a release date on a streaming service (e.g., video-on-demand, replay, etc.). The first time may also simply be an arbitrary time determined by the user profile at which the user desires to watch a media asset. For instance, the user may wish to watch a media asset at 8 pm, after going to the gym from 6 pm to 7 pm. The first time T1 is therefore fixed in advance and known by the media content system. The media assets involved at step 302 may be only media assets matching the profile. For instance, a viewing history or preferences associated with the profile may be used to pre-select the matching media assets. Alternatively, the media assets involved at step 302 may be of all kinds and the media assets that do not match the profile will be set aside using the scoring. The media content system may thus narrow down the scope of content summaries to be provided to the profile.

At step 304, control circuitry determines a second time T2, which is located a period a time prior to the first time T1. The second time T2 corresponds to a time at which the profile may be provided with content summaries. The media content system may receive a request for content summary from the profile (e.g., an input on the user interface), indicating that the user is available to watch some content before the media assets start at the first time T1. That request may be detecting that the profile is on (e.g., by the user turning on the user device or specifically requesting content summaries for upcoming media assets, by means of a clickable button). From the point of view of the user, this corresponds to free time for which he or she is available to watch some content before the first time T1. Contrary to the first time T1, the second time T2 is not determined in advance. In an implementation, the first time T1 is known by the media content system before the second time T2 is known. The period of time PT defined by the amount of time between the second time T2 and the first time T1 may be of any length. The period of time PT may be between 5 min and 1 hour, or between 10 min and 30 min. In the above example of a prime time, the first time T1 is set by the media asset providers and does not depend on the user, while the second time T2 entirely depends on the user. In the example of the first time T1 being the end of a commercial break, the second time T2 may be the beginning of the commercial break; the period of time is then likely to be just a few minutes long.

At step 306, control circuitry retrieves a pool of content summaries that are related to the media assets. As illustrated in FIG. 1, for each media asset, one or more content summaries are retrieved (three content summaries 104a-c for media asset 104, one content summary 106a for media asset 106 and two content summaries 108a-b for media asset 108). If there are N media assets at the first time T1 and Mj content summaries retrieved for the $j^{th}$ media asset, then the total number of retrieved content summaries is M1+ . . . +Mj+ . . . +MN. In an embodiment, the content summary does not include content from the upcoming media content. This enables the media content system to avoid spoiling an asset for the user. In an embodiment, the content summary includes content related to the media asset (for instance, previous episodes in the case of a series or an ongoing show, or content similar to the media asset to provide a background to the user). In one implementation, the retrieved content summaries all have a duration that is shorter than the period of time PT. In another implementation, the retrieved content summaries may have a duration that is longer than the period of time PT. More detail will be given below.

At step 308, control circuitry computes a score for each of the retrieved content summaries of the pool. The score takes into account a duration of the content summary compared to the period of time PT. In an embodiment, the score also takes into account a linearity of the media asset. The score might be an integer, such that a relationship order may be defined between different scores. More details about the score are given below.

At step 310, control circuitry generates for display a list of selected content summaries among the pool of content summaries. The list may contain all the content summaries of the pool or only a fraction thereof. Control circuitry selects the content summaries using the computed scores. In an embodiment, control circuitry generates for display the list of selected content summaries as ranked by score. Higher scoring episodes will be more easily clickable (e.g., at the top, taking more space on the display, etc.) than the lower scoring episodes (e.g., at the bottom, taking less space on the display, etc.).

At step 312, control circuitry receives, from the profile (and thus the user) an input indicating a choice of a content summary of those generated for displayed at step 310. In response, control circuitry may therefore start playing the chosen content summary.

At step 314, control circuitry receives, from the profile, an input indicating a choice of a media asset that begins at the first time T1, and control circuitry generates instructions to display that media asset at the first time T1. In one embodiment, the input indicating a choice of the media asset uses the input indicating a choice of the content summary (at step 312), such that a same action from the user causes watching the content summary for the media asset, between the second time T2 and the first time T1, and watching the media asset at the first time T1. For instance, there is no need to switch to a channel airing the chosen media asset or leave a menu to access this channel.

It is indeed understood that the user is likely to watch the media asset for which he or she requested to watch a content summary. The media content system therefore ensures a smooth experience, which optimizes the available time of the user while enhancing the pleasure of watching a series.

The content summary may include content from other episodes of the series. In particular, when the media asset is linear (or sequential), the content summary may include content from previous episodes (e.g., from previous episodes only). In order to improve the quality of the content summary, control circuitry may take into account the episodes of the series last-viewed by the profile. In that case, the content summary may include content from episodes between the last-viewed episode (excluded or included) and the upcoming episode (excluded, as it may not be available or no spoilers are desired). In one implementation, only those episodes are used. Control circuitry may further take into account the date of the last viewed episode. If that date is prior to a threshold (for instance one week or one month before the second time T2), the content summary may include content from any episode preceding the upcoming episode. As it is possible that the viewer has forgotten about the last-viewed episode, this enables the media content system to provide a content summary that is extensive enough for the viewer to better enjoy the upcoming episode. If the date of the last-viewed episode is before the threshold, then the content summary may include content from the episodes between the last-viewed episode and the upcoming episode, as detailed above.

In an embodiment, step 306 of retrieving the content summaries may include receiving the content summaries from an external provider (or several external providers). The content summaries may therefore be pre-generated and distributed upon request. The media asset provider or producer may have generated a plurality of content summaries for the media asset. In another embodiment, step 306 of retrieving the content summaries may include generating the content summaries. In this case, control circuitry may retrieve content related to the media asset for which a content summary is to be generated. The retrieved content may be readily accessible on at least one server device for the profile. For instance, if a profile has a subscription to a premium streaming service which has all the previous episodes available, control circuitry may use any of those episodes. Conversely, if a profile has no subscription to a premium service, and therefore not all the previous available episodes are accessible but only a fraction thereof is (e.g., on a free streaming service), then control circuitry may use any episodes of that fraction. If no content is readily accessible, then no content summary for the media asset is generated. Consequently, no content summaries will be provided.

In an embodiment, at step 306, each content summary that is retrieved or generated has a duration that is less than the period of time PT. A score will be computed only for those content summaries. In another embodiment, the content summaries may have a duration that is more than the period of time PT. In that case, either the control circuitry may filter and discard the content summaries whose duration is more than the period of time PT (this therefore amounts to retrieving or generating only content summaries whose duration is not greater than the period of time). In an implementation, instead of discarding those content summaries, control circuitry may shorten them, thereby creating a summary of a content summary, in order for it to have a duration that is less than or equal to the period of time PT. Alternatively, at step 306, the retrieved content summary may have a duration that is more than the period of time PT but the score, at step 308, will reflect that information so that the content summary is not provided to the profile.

As explained above, the score has a function to rank the content summaries. In one embodiment, the score takes into account the duration of the content summary compared to the period of time. The closer the duration is to the entire period of time (but not greater), the higher the score for that content summary. In one embodiment, the score also takes into account a linearity of the media asset. In this situation, the media asset is considered to be an episode of a series. A linear series (or sequential series) is a series for which the episodes are arranged in a specific order and are interrelated in terms of plotline. A consequence is that the episodes, for a better experience, need to be watched in the specific order. The degree of linearity may differ between series, or between sections (i.e., a certain number of consecutive episodes) thereof. The higher the linearity of the series to which the upcoming media asset belongs, the higher the score of the content summary for that media asset.

In the expression of the score, the importance of the duration D compared to the period of time may use the ratio D/PT. The ratio for content summary spanning exactly the entire period of time D (that is to say from the second time T2 to the first time T1) is 1. A ponderation coefficient A may be used to arbitrate (A·D/PT). As indicated above, the content summaries that are considered may have a duration D less or greater than the period of time PT. In the former case, where the duration D is less than or equal to period of time PT, the expression D/PT is acceptable. However, in the latter case, where the duration is greater than the period of time PT, the expression D/PT is not acceptable because the longer the content summary, the higher the score. To avoid such a situation, the score may include a selective expression to discriminate. For instance, a conditional formula may be used, such as: if D<PT, then Sc=0; otherwise Sc=A·D/PT. Any time of expression allowing the score to discriminate as desired based on the duration D and the period of time PT may be used.

In the expression of the score, the importance of the linearity of the media asset may be expressed with linearity index K. Such index may be determined using metadata associated with the media asset or information retrieved from different sources. For instance, the index K may be stored with the content summary, or may be a metadata retrieved independently from the content summary. The server device might store the index K in storage 230. The index K may take several predetermined values in the function of the linearity. For instance, a highly linear media asset (that is to say a media asset that is a series where the main plotline evolves substantially between episodes of the series) may have K=1 (e.g., series "24" with Jack Bauer, or "Mindhunter"). A mildly linear media asset (that is to say a media asset that is a series where the main plotline barely evolves between two consecutive episodes) may have K=0.5 (e.g., "The Simpsons", "Friends"). A non-linear media asset (that is to say a media asset that is a series where there is no plotline) may have K=0. In a similar manner to the ratio D/DP, a ponderation coefficient B may be used to arbitrate (B·K).

In an implementation, the linearity index of the media asset may depend on the episode of the series. For instance, depending on the episode(s) of a series, a media asset may be non-linear at some point, mildly linear at another point and highly linear at another point. For instance, episodes of a same TV game are usually non-linear, and each episode is self-sufficient in terms of content. However, there may be a sequence of episodes during which a same candidate appears. Although it is not paramount to enjoy the episodes, it is preferable to have a knowledge of what happened in previous episodes. That media asset (i.e., the upcoming episode with the candidate) may be labeled as mildly linear. Finally, during some periods of the year, there may be a single session of the TV game that is split and spread over a plurality of episodes. In this situation, to enjoy the episodes it is highly recommended to have a knowledge of what happened in previous episodes. Another example is "Friends", which would oscillate between being labelled as mildly linear or highly linear.

In addition, the determination of the linearity may take into account a viewing history of the profile. If between the episode last-viewed by the profile and the upcoming episode (i.e., the media asset) there are a certain number of episodes, then even a mildly linear series between consecutive episodes may become highly linear over that certain number of episodes. Therefore the score may take into account the number of episodes, in a sequential series, between the episode last-viewed by the profile and the upcoming episode. This can be defined arbitrarily, with K=1, if that number of episodes is more than three or five, for instance.

In an implementation, the linearity index K may be more precisely defined, with more than three values or with a continuous scale (or quasi-continuous, such as a percentage).

As mentioned above, the score may also take into account a match between the media asset and the profile (viewing history or preferences). In the expression of the score, the importance of the match may be expressed with preference index L. Such preference index L may be determined in different ways, and may use known algorithms of recommendations. L may have a value close to 1 when the media asset strongly matches the profile or a value close to 0 when the media asset poorly matches the profile. This is another implementation of the selection of media of interest described above. In a similar manner to the ratio D/DP and the linearity index, a ponderation coefficient C may be used to arbitrate (C·L).

Combining the previous examples, a score Sc may be as: if D>PT, then Sc=0; otherwise Sc=A·D/PT+B·K+C·L, where A and B are ponderation coefficients. D/PT, K and L are in competition, such that a content summary for a highly linear media asset might get a high score even though its duration does not span the whole period of time PT (for a same value of L). Conversely, a content summary for a non-linear media asset (K=0) might get a lower score, even though its duration equals the period of time PT (for same value of L). The choice of A, B and C depends on the characteristics of an operator who implemented the score and enables to choose the influence of the duration, of the linearity and of the preference on the computed score. This is exemplified with the following situations, when D=PT, K=0.5, and L=1 then Sc=A+B/2+C and when D=PT/2, K=1 and L=1 then Sc=A+B/2+C. Based on the values of A and B, either of the two scores may be higher than the other one. The same reasoning can be used for coefficient C.

In an embodiment, control circuitry does not cause to be provided content summaries for non-linear media assets. Several implementations to do so are possible. First, the selection may be performed upstream: control circuitry may operate a selection of the upcoming media assets. For instance, among the matching media assets (i.e., those identified using the profile), only the linear ones are kept (i.e., those being episodes of a linear series). As a result, the pool of content summaries contains content summaries only for linear media assets. Second, the selection may be performed midstream: control circuitry may compare the computed score with a threshold and will not cause to be provided content summaries whose scores are below the threshold. In the example above, when a media asset is non-linear, K=0 and the score will be low. The higher K, the more discriminating the formula will be against scores of content summaries for non-linear media assets. Alternatively, a conditional formula may be implemented as well, as for the duration D: if K=0, then the score is 0. The same reasoning applies for media assets with low preference indices (less than a threshold, for example). Either those media assets are not considered when retrieving content summaries or the score will set them aside (as C·K will be low, the overall score may be low), or a conditional formula may be added, such as: if L<Lt where Lt is a predetermined preference threshold, then the score is 0.

After the viewer chooses a content summary, at step 312, control circuitry starts playing the content summary. However, the viewer might change his or her mind at any time between the second time T2 and the first time T1.

Figure 4:
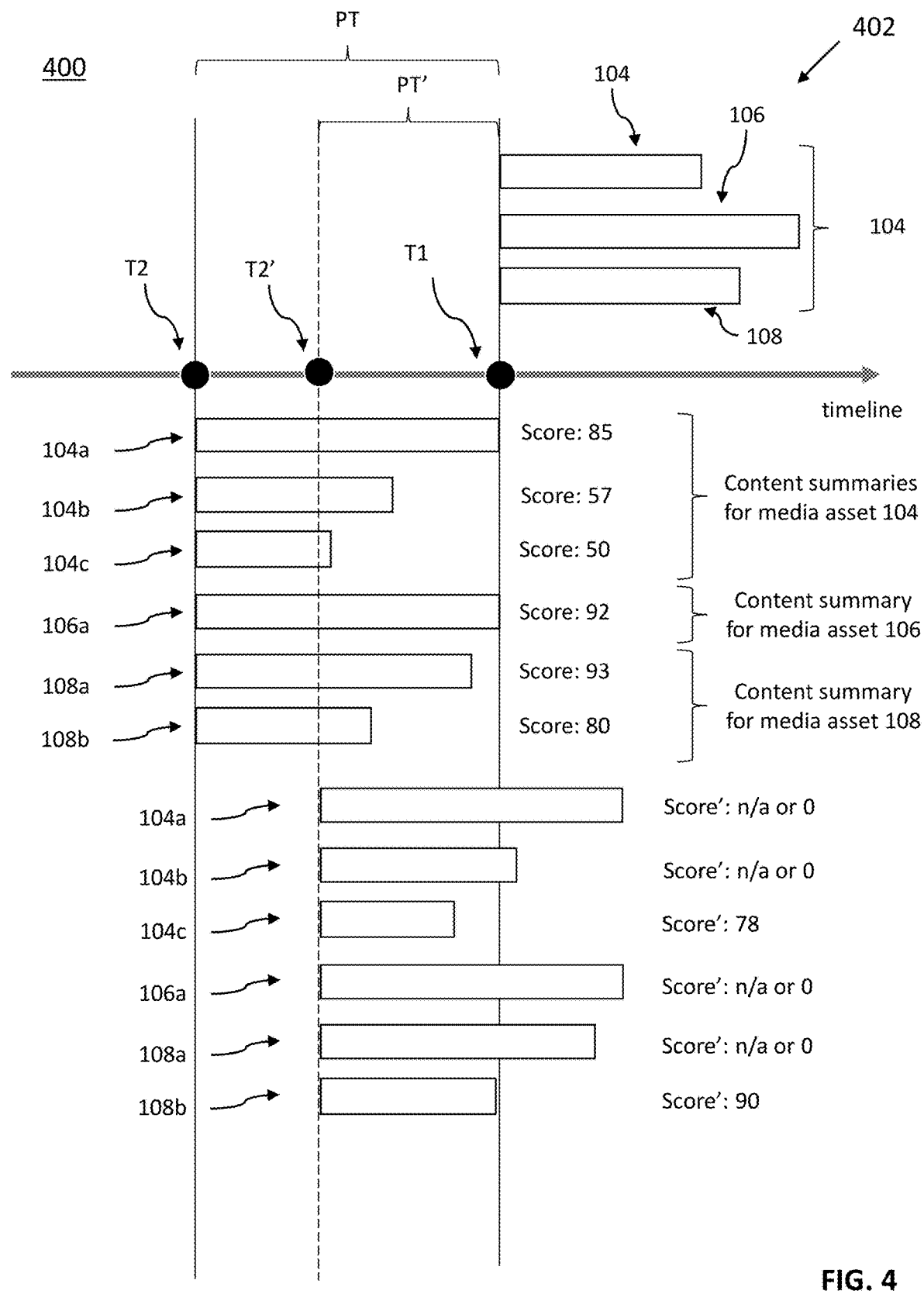
FIG. 4 depicts an illustrative diagram of an implementation in which the user changes his or her mind while watching a content summary, in accordance with some embodiments of the disclosure.
Figure 5:
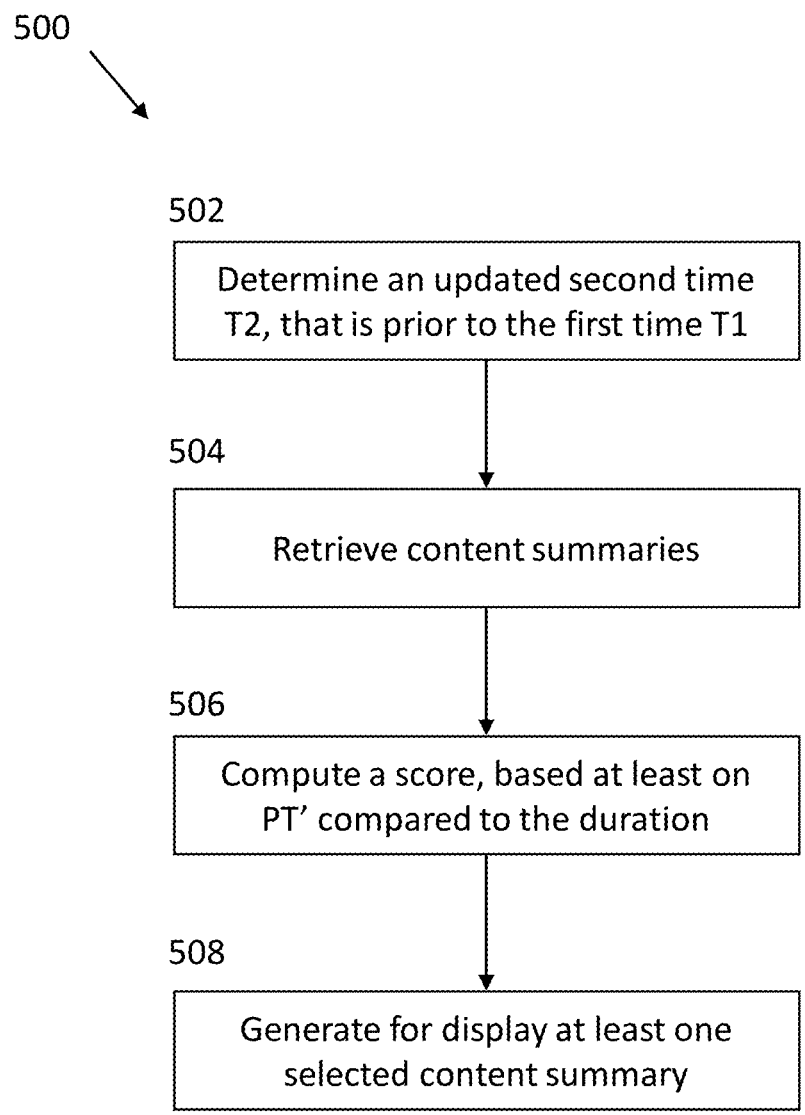
FIG. 5 is an illustrative flowchart of an implementation of FIG. 4, in accordance with some embodiments of the disclosure.

FIG. 4 shows an illustration 400 of different steps for an update in providing a content summary for a media asset to a profile, by means of a media content system (not illustrated in FIG. 4), and FIG. 5 is an illustrative associated flowchart of a process 500, in accordance with some embodiments of the disclosure. In FIG. 4, which includes a portion of FIG. 1, the same references as those of FIG. 1 are maintained for the same elements, and updated elements are marked with an apostrophe ('). At step 502, control circuitry determines an updated second time T2', which is a period of time prior to the first time T1, but later than the original second time T2. The updated second time T2' leads to an updated period of time PT' before the first time T1. The media content system may receive a request for another content summary from the profile (e.g., an input on the user interface), indicating that the user desires to watch something else before media assets start at the first time T1. This request may be detecting that the content summary being played has been paused or closed. At step 504, control circuitry retrieves an updated pool of content summaries that are related to the media assets. The rest of the process 500 is identical to process 300, with control circuitry generating, at step 506, a score for the content summary, and, at step 508, generating for display at least one selected content summary based on the updated score. The steps corresponding to steps 312 and 314 are not disclosed here but are identical. The updated pool of content summaries may be a fraction of the pool of content summaries retrieved at step 306, in which only the content summaries whose duration is not greater than the updated period of time PT' are kept, with a filter as disclosed previously (as illustrated in FIG. 4, with n/a for the updated score). Alternatively, the updated pool of content summaries is unchanged, but the updated score will set aside the content summaries whose duration is greater than the updated period of time PT', as disclosed previously (also illustrated in FIG. 4, with an updated score of 0 for those content summaries). Alternatively or complementarily, new content summaries, which were not present in the original pool, may be added. As the updated period of time PT' is different from the period of time PT, the score for each content summary is also updated, such that, for instance, a poorly scored content summary (because too short, for instance) becomes highly-scored as its duration may now match the updated period of time PT'. FIG. 4 illustrates this situation, with updated scores (score of 78 versus an updated score of 50 for content summary 104c for example) that then lead to a new ranking in for media summaries (not presented as ranked in FIG. 4). In addition, to avoid submitting to the profile a content summary that was already chosen and then finally refused, control circuitry may, either at step 504 or step 506 take that into account and either filter and discard the already-chosen content summary (if not automatically set aside because of its duration) or add a parameter in the formulation of the score. In a similar manner, control circuitry may do the same for all the content summaries related to the content summary that was chosen and then refused (in other words, all the content summaries for the media asset).

In an embodiment, the media content system may enable a user to catch up on content that was aired while he or she was watching something else. In particular, this embodiment is useful when several episodes of a series are aired and the user decides, after having watched one or two episodes of a series, to switch to another series on another channel, during a commercial break. Control circuitry determines that a media asset (e.g., an episode of a series) of interest was being displayed to the profile between a third time and a fourth time. The third time is prior to the fourth time and the fourth time is prior to the second time (or equal to it). At the second time, control circuitry retrieves content summaries for upcoming media assets that are not related to the media asset of interest (e.g., other episodes of the series). Indeed, as the user has just seen episodes of the series, he or she is not interested in watching a content summary. However, he or she might want to watch another series, for which episodes were aired during the third time and the fourth time. Therefore, the content summaries for the unrelated media asset include content that was aired between the third and the fourth time. In an implementation, the third time is the beginning of an episode of a series, the fourth time is the end of an episode of a series, the second time is the beginning of a commercial break and the first time is the end of the commercial break and also the beginning of an episode of another series. In particular, the fourth time and the second time may be identical.

Figure 6:
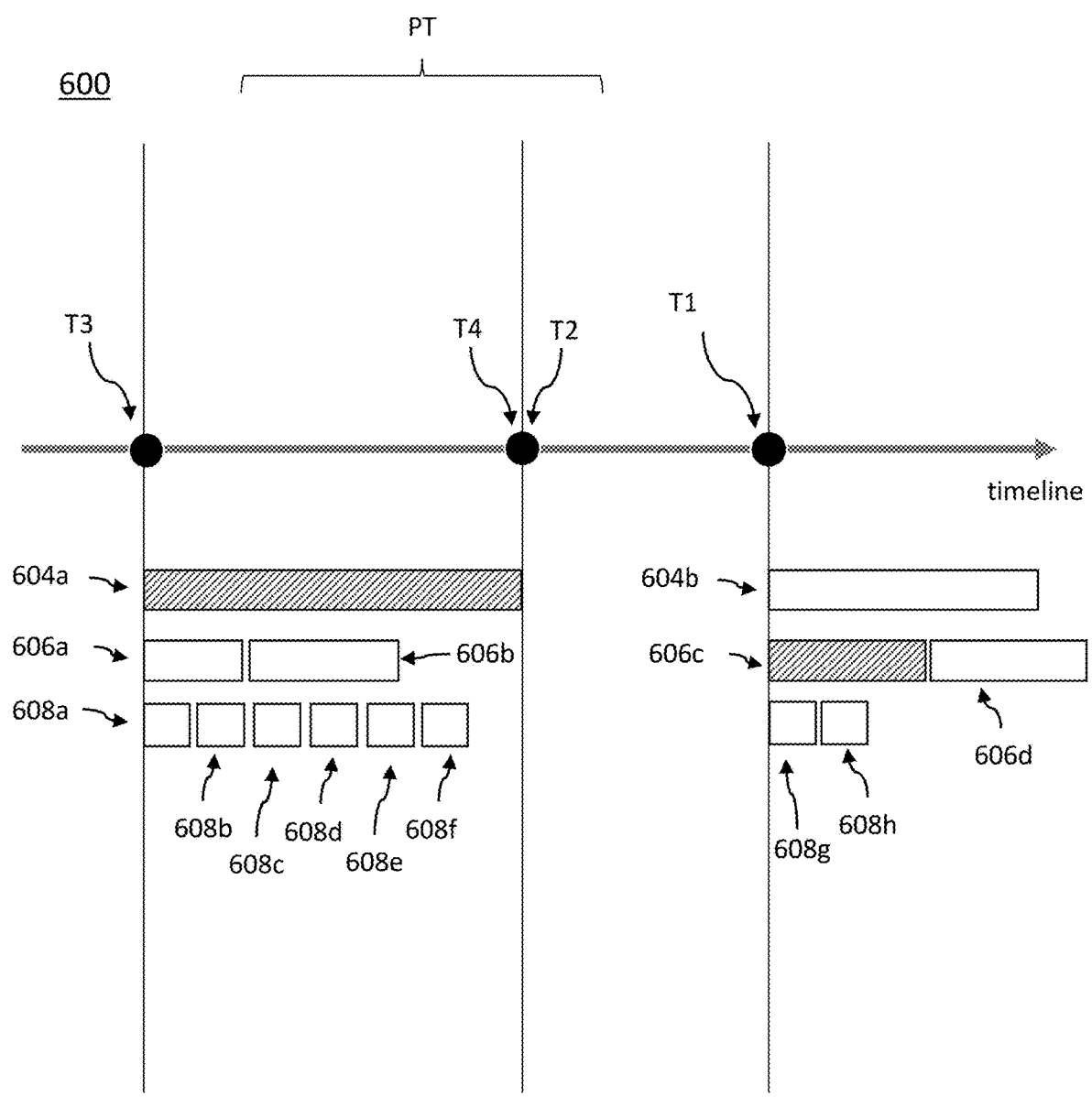
FIG. 6 is an illustrative diagram of a situation of an implementation in which the user decides to watch another media asset, in accordance with some embodiments of the disclosure.

FIG. 6 shows an illustration 600 for the embodiment with the third time T3 and the fourth T4, which involve three different series 604, 606, 607 whose episodes are respectively 604a-b, 606a-d, 608a-h (a media asset being an episode of a series). Between the third time T3 and the fourth time T4, episode 604a of series 604, episodes 606a and 606b of series 606 and episodes 608a-f of series 608 are accessible. However, the user chose on his or her profile to watch series 604 (episode 604a, watched in FIG. 6) and therefore cannot watch series 606 and 608. The fourth time T4 is defined as the end of the episode 604a, and the first time T1 is defined as the beginning of the upcoming episodes 604b for series 604, upcoming episode 606c for series 606 and upcoming episode 608g for series 608. At the fourth time T4, the user decides to watch something else. At the second time T2, which is the beginning of a commercial break (that matches the end of the episode 604a and therefore matches the second time T2, in FIG. 6), the media content system provides for the profile content summaries (not illustrated) relating to the series 606, 608, and including content from episodes 606a-b for content summaries for series 606 and content from episodes 608a-f for series 608. This way, during the commercial spanning between the second time T2 and the first time T1, the user may choose a content summary of media assets that he or she missed between the third time T3 and the fourth time T4, and he or she can go on at the first time T1 watching the next episode of the series for which he or she has just watched the content summary.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   identifying, based on a user profile, a plurality of media assets, each of the media assets scheduled to begin at a common first time;
   receiving, at a second time prior to the first time, a user input to view content summaries;
   calculating, based on the difference between the first time and the second time, a time period;
   retrieving a pool of content summaries, including at least one content summary for each of the plurality of media assets that are scheduled to begin at the common first time;
   determining, for each content summary in the pool, whether a duration of the content summary is longer than the calculated time period;
   removing content summaries with a duration longer than the calculated time period from the pool of content summaries;
   computing a score for each content summary remaining in the pool, wherein the score is based at least on a duration of the content summary; and
   causing a list of content summaries for the one or more media assets to be generated for display, wherein the content summaries are selected amongst the pool based on the score, and wherein the content summaries are ordered based on the duration of the content summaries.

2. The method of claim 1, wherein retrieving a pool of content summaries comprises:
   identifying that a media asset is an upcoming episode of a series of media assets;
   identifying, based on the user profile, unwatched episodes from the series of media assets; and
   generating at least one content summary for a media asset using an unwatched episode of the series of media assets.

3. The method of claim 1, wherein the score is further based on a viewing history accessed via the user profile.

4. The method of claim 1, wherein, for a media asset that includes at least one upcoming episode of a series, the method further comprises:
   accessing the user profile;
   identifying, based on the user profile, a last-viewed episode of the series;
   determining whether the last-viewed episode corresponds to the episode directly preceding the upcoming episode; and in response to determining that the last-viewed episode does not correspond to the episode directly prior to the upcoming episode:
including in the content summary content from at least one previous episode of the series, that occurs after the last-viewed episode.

5. The method of claim 4, wherein the score is further based on the number of episodes between the last-viewed episode and the upcoming episode.

6. The method of claim 1, further comprising:
receiving a selection a content summary, from the pool of content summaries, to play; and
receiving, via a user interface element associated with the selected content summary, a selection of the media asset to be provided at the first time.

7. The method of claim 1, further comprising:
receiving, at a third time prior to the start time, a second user input associated with viewing the content summaries;
calculating, based on the first time and the third time, a second time period;
automatically determining, for each content summary in the pool, whether a duration of the content summary is longer than the calculated second time period; and
automatically updating the pool of content summaries by removing content summaries with a duration longer than the calculated second time period from the pool of content summaries.

8. The method of claim 7, further comprising automatically updating the pool of content summaries with one or more new content summaries.

9. The method of claim 8, further comprising updating the score of each content summary in the pool.

10. The method of claim 1, further comprising:
determining, based on the user profile, that a media asset of interest was caused to be provided between the first user input and the second user input;
wherein:
the one or more content summaries to be provided are for media assets that are not related to the media asset of interest; and
the one or more content summaries include content that was aired between the first user input and the second user input.

11. A computing device comprising control circuitry configured to:
identify, based on a user profile, a plurality of media assets, each of the media assets scheduled begin at a common first time;
receive, at a second time prior to the first time, a user input to view content summaries;
calculate, based on the difference between the second time and the first time, a time period;
retrieve a pool of content summaries, including at least one content summary for each of the plurality of media assets that are scheduled to begin at the common first time;
determine, for each content summary in the pool, whether a duration of the content summary is longer than the calculated time period;
remove content summaries with a duration longer than the calculated time period from the pool of content summaries;
compute a score for each content summary remaining in the pool, wherein the score is based at least on a duration of the content summary; and
cause a list of content summaries for the one or more media assets to be generated for display, wherein the content summaries are selected amongst the pool based on the score, and wherein the content summaries are ordered based on the duration of the content summaries.

12. The method of claim 1, wherein a media asset of the plurality of media assets is an episode in a series, and the score is further based on a linearity of the media asset associated with the content summary.

13. The method of claim 1, wherein:
the method further comprises comparing the duration of the content summaries to the time period; and
computing the score further comprises computing the score based on how close the duration of the content summary is to the period of time.

14. The method of claim 1, further comprising:
receiving a media asset of the plurality of media assets;
receiving, during a commercial break associated with the media asset, a second input associated with viewing content summaries;
updating the pool of content summaries with content summaries relating to the media asset; and
generating the updated list of content summaries for display.

15. The method of claim 14, further comprising:
calculating, based on the second input and the duration of the commercial break, a second time period;
automatically determining, for each content summary in the pool, whether a duration of the content summary is longer than the calculated time period; and
automatically removing content summaries with a duration longer than the calculated second time period from the pool of content summaries.

16. The method of claim 1, wherein causing a list of content summaries for the one or more media assets to be generated for display further comprises causing a representation of the scores associated with each of the content summaries to be generated for display.

17. The method of claim 1, wherein identifying the plurality of media assets based on the user profile further comprises identifying only those media assets that meet a criteria set by the user profile.

18. The method of claim 1, wherein:
identifying the plurality of media assets based on the user profile further comprises assigning a weighting to each of the plurality of media assets; and
computing the score for each content summary further comprises computing the score for each content summary based on the weighting.

19. The method of claim 1, wherein causing a list of content summaries for the one or more media assets to be generated for display further comprises generating user interface elements associated with the selected content summaries.

20. The method of claim 19, wherein each of the user interface elements are sized based on the score of the associated content summary.

* * * * *